United States Patent
Bougauchi et al.

(10) Patent No.: US 6,334,317 B1
(45) Date of Patent: Jan. 1, 2002

(54) AIR CONDITIONER

(75) Inventors: Tsukasa Bougauchi, Itami; Yuji Shimamura, Ikoma-Gun, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/456,412

(22) Filed: Dec. 8, 1999

(30) Foreign Application Priority Data

| Dec. 8, 1998 | (JP) | 10-348384 |
| Dec. 22, 1998 | (JP) | 10-364403 |
| Dec. 22, 1998 | (JP) | 10-364404 |

(51) Int. Cl.⁷ ................................................. F25B 49/00
(52) U.S. Cl. ................... 62/127; 62/129; 236/51; 345/114; 345/117
(58) Field of Search .................... 345/114, 117, 345/102; 52/125, 127, 129; 236/51, 94; 165/11.1

(56) References Cited

U.S. PATENT DOCUMENTS

| 4,929,936 A | * | 5/1990 | Friedman et al. | 340/715 |
| 5,482,209 A | * | 1/1996 | Cochran et al. | 236/94 |
| 5,596,343 A | * | 1/1997 | Snider | 345/102 |
| 5,703,625 A | * | 12/1997 | Snider et al. | 345/168 |
| 5,796,350 A | * | 8/1998 | Fuse | 340/815.75 |
| 5,907,315 A | * | 5/1999 | Vlahos et al. | 345/114 |
| 6,084,564 A | * | 7/2000 | Ohara et al. | 345/113 |
| 6,115,023 A | * | 9/2000 | Uchida | 345/114 |
| 6,164,374 A | * | 12/2000 | Rhodes et al. | 236/94 |

FOREIGN PATENT DOCUMENTS

| JP | U5- 90445 | 12/1993 |
| JP | A10-205863 | 8/1998 |
| JP | A10-205864 | 8/1998 |
| JP | A10-210567 | 8/1998 |
| JP | A10-253131 | 9/1998 |
| JP | A10-267369 | 10/1998 |
| JP | A10-268837 | 10/1998 |
| JP | A10-318591 | 12/1998 |

* cited by examiner

Primary Examiner—William E. Tapolcai

(57) ABSTRACT

In an air conditioner of the present invention, the contrast of a liquid crystal display provided on an indoor unit can be adjusted by operating a remote control unit. In another air conditioner of the present invention, the condition of the room air is detected and a notification display urging the user to perform an appropriate operation of the air conditioner is provided on the liquid crystal display. In yet another air conditioner of the present invention, an abnormality and an operation condition of the air conditioner are detected and a notification display urging the user to appropriately handle the situation is provided on the liquid crystal display. In still another air conditioner of the present invention, when the operation start time is set with the timer, the backlight of the liquid crystal display is off during a warm-up operation performed prior to the operation start time.

11 Claims, 10 Drawing Sheets

AIR CONDITIONER

BACKGROUND OF THE INVENTION

1. Field of the Invention

The present invention relates to an air conditioner instructed to operate with a remote control unit, said air conditioner having a liquid crystal display on an indoor unit thereof.

2. Description of the Prior Art

A separation-type air conditioner comprises an indoor unit placed on the wall of a room to be air-conditioned and an outdoor unit placed outdoors.

Moreover, some air conditioners employ an indoor unit and an outdoor unit that are integral with each other. Such integral-type air conditioners are provided with an indoor unit and an outdoor unit that are installed on the indoor and outdoor sides, respectively, of an opening formed in a wall or a window.

In the following descriptions, an indoor unit of a separation-type air conditioner will be presented. However, it should be noted that the indoor unit of the present invention is not limited to the indoor unit of a separation-type air conditioner, but is applicable also to the indoor-side configuration of an integral-type air conditioner.

FIG. 1 is an exterior view showing an indoor unit of a typical separation-type air conditioner. On the indoor unit 1, a liquid crystal display 5 for displaying various pieces of information is disposed in the vicinity of an air outlet 4 incorporating an up-and-down wind direction louver 3. The operation of the air conditioner is controlled by a microcomputer being incorporated. By the user operating a remote control unit 2, a signal instructing the air conditioner to operate is transmitted to the microcomputer.

FIG. 2 is an exploded perspective view of the liquid crystal display 5. Reference numeral 6 represents a liquid crystal panel for displaying letters and symbols. Reference numeral 7 represents a backlight for illuminating the liquid crystal panel 6 from behind so that the display becomes clear. The backlight 7 comprises a plurality of light emitting diodes (LEDs). Reference numeral 8 represents a unit cover for covering the backlight 7. The unit cover 8 uniformizes the illumination light incident on the liquid crystal panel 6.

FIG. 3 is a front view of the remote control unit 2. The remote control unit 2 has, as operation buttons, a start/stop button 2a for starting and stopping the air conditioner, a temperature setting button 2b for increasing and decreasing the set temperature, an operation start timer button 2c, and a light adjustment button 2d. A liquid crystal display 2e is also provided for displaying the contents of signals transmitted by the operation buttons 2a, 2b, 2c and 2d and various pieces of information.

Problems of the conventional air conditioner having the above-described structure will be described.

First, a first problem will be described. FIG. 4 shows the arrangement of a circuit for controlling the liquid crystal display 5. An IC driver circuit 9 has a contrast fine adjustment possible circuit (not shown), and the liquid crystal display 5 is connected thereto by a signal line 10. A thermistor 11 detects a subtle change in ambient temperature and inputs the detected change to the IC driver circuit 9. The contrast fine adjustment possible circuit controls the contrast of the liquid crystal panel 6 of the liquid crystal display 5 based on the input signal from the thermistor 11. However, since the liquid crystal display 5 is situated in the vicinity of the air outlet 4, the ambient temperature drastically changes while air conditioning is being performed. Therefore, the control of the liquid crystal panel 6 by the contrast fine adjustment possible circuit cannot follow the temperature change, so that the contrast cannot sufficiently be adjusted.

Next, a second problem will be described. There are cases where the display on the liquid crystal display 5 cannot clearly be viewed by the user according to the position of placement of the indoor unit 1. In such cases, according to the prior art, the remote control unit 2 is operated to adjust the light quantity of the backlight 7. However, this is insufficient to improve the viewability of the liquid crystal display 5.

Next, a third problem will be described. When the room air is dirty, it is desirable for the air conditioner to perform an air-cleaning operation or a ventilating operation. When the humidity in the room becomes low or high, it is desirable to perform a humidifying operation or a dehumidifying operation. However, to perform these operations, it is necessary for the user himself or herself to notice the condition of the room air.

Next, a fourth problem will be described. When the air conditioner is out of order, it does not operate even though the user instructs it to operate. When the user instructs the air conditioner to perform an operation while the air conditioner is performing another operation, there are cases where the air conditioner cannot perform the operation it is instructed to perform. For example, while the air conditioner is performing a defrosting operation, it cannot perform a heating operation even though it is instructed to do so. In such cases, the conventional air conditioner provides the user with no notification. Consequently, every time this happens, unnecessary worry and confusion are caused to the user.

Next, a fifth problem will be described. When the air conditioner is operated with the operation start timer, a warm-up operation is typically performed before the air conditioner starts to operate. In the conventional air conditioner, the backlight 7 of the liquid crystal display 5 is turned on at the start of the warm-up operation. However, when the operation start time is set in accordance with the time when the user gets up or the time when the user comes home, it is a waste of power that the backlight 7 is on during the warm-up operation. Particularly, when the operation start time is set at the time when the user gets up, turning on of the backlight 7 before the operation start time sometimes awakens the user unpleasantly.

SUMMARY OF THE INVENTION

An object of the present invention is to provide an air conditioner in which a desirable display is provided on the liquid crystal display of the indoor unit.

To achieve the above-mentioned object, an air conditioner of the present invention is provided with: an indoor unit; a liquid crystal display provided on the indoor unit for displaying various pieces of information; and a remote control unit for transmitting a signal to instruct the air conditioner to operate. Here, contrast of a display on the liquid crystal display is adjustable by operating the remote control unit.

Another air conditioner of the present invention is provided with: an indoor unit; a liquid crystal display provided on the indoor unit for displaying various pieces of information; a backlight provided on the liquid crystal display for illuminating a display on the liquid crystal display; at least one of an air cleaner, a ventilator, a dehumidifier and a humidifier; and at least one of contamination detecting means for detecting contamination of room air and humidity detecting means for detecting humidity of room air. Here, when the contamination detecting means detects contamination of the room air, a notification display urging the air cleaner or the ventilator to operate is provided on the liquid crystal display, or when the humidity detecting means detects that humidity of the room air is high, a notification display urging the dehumidifier to operate is provided, or when the humidity detecting means detects that the room air is dry, a notification display urging the humidifier to operate is provided, and the backlight is lit in a color different from a color for a normal display.

Yet another air conditioner of the present invention is provided with: an indoor unit; a liquid crystal display provided on the indoor unit for displaying various pieces of information; and a backlight provided on the liquid crystal display for illuminating a display on the liquid crystal display; and at least one of abnormality detecting means for detecting a failure and an abnormality of the air conditioner and operation condition detecting means for detecting that an operation the air conditioner is instructed to perform cannot be performed. Here, when the abnormality detecting means detects a failure of the air conditioner, a notification display indicating that a failure occurs is provided or when the operation condition detecting means detects that an operation the air conditioner is instructed to perform cannot be performed, a notification display indicating that the operation cannot be performed is provided, and the backlight is lit in a color different from a color for normal display.

Still another air conditioner of the present invention is provided with: an indoor unit; a liquid crystal display provided on the indoor unit for displaying various pieces of information; and a backlight provided on the liquid crystal display for illuminating a display on the liquid crystal display; a remote control unit for transmitting to a control unit a signal to instruct the air conditioner to operate and a signal to turn on or off the backlight; and a timer for causing the air conditioner to start to operate at a set time. Here, when an operation start time of the air conditioner is set with the timer, the backlight is off during a warm-up operation performed before the air conditioner starts to operate, and when the air conditioner starts to operate, the backlight is turned on.

BRIEF DESCRIPTION OF THE DRAWINGS

This and other objects and features of this invention will become clear from the following description, taken in conjunction with the preferred embodiments with reference to the accompanying drawings in which.

DESCRIPTION OF THE PREFERRED EMBODIMENTS

Figure 1:
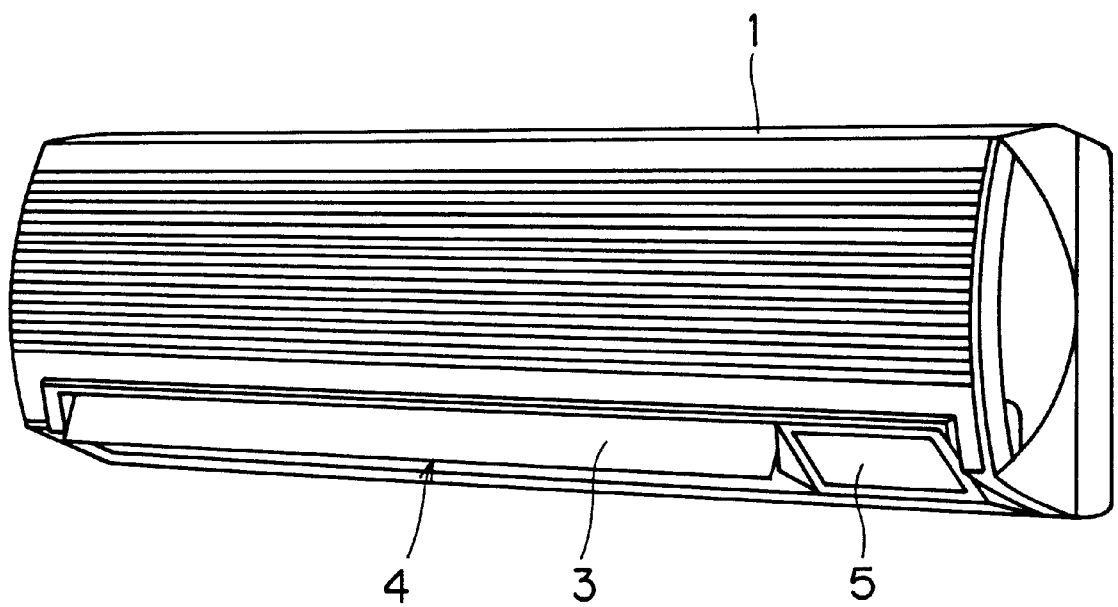
FIG. 1 is an exterior view showing the indoor unit of the typical separation-type air conditioner.
Figure 1:

Hereinafter, embodiments of the present invention will be described with reference to the drawings. The main structures of the air conditioners of the embodiments are the same as that shown in FIGS. 1 to 3. Therefore, members having the same designations are denoted by the same reference numerals and no overlapping description will be given.

Figure 2:
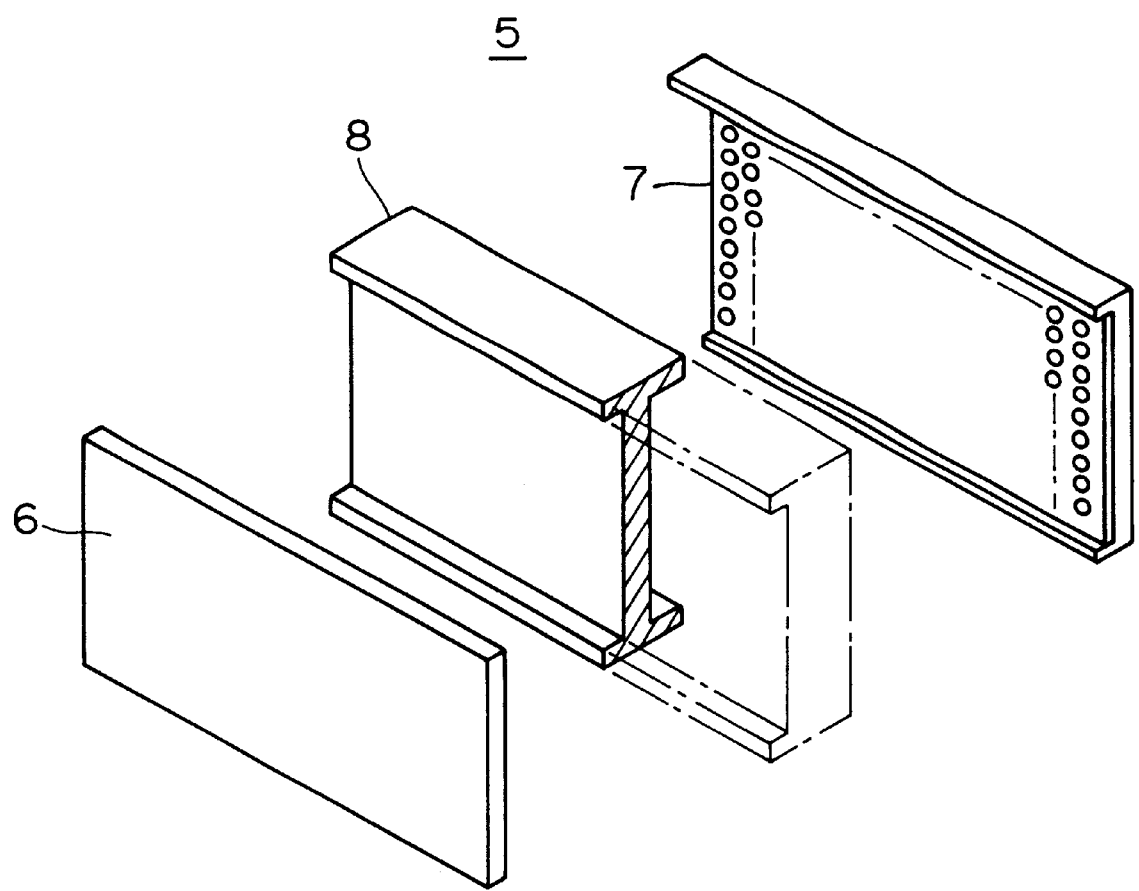
FIG. 2 is an exploded perspective view of the liquid crystal display.

While the liquid crystal display 5 is disposed in the vicinity of the air outlet 4 in the indoor unit 1 shown in FIG. 1, in the subsequently-described embodiments, the liquid crystal display 5 may be disposed in any position on the front surface of the indoor unit 1. Moreover, the light emitting elements constituting the backlight 7 shown in FIG. 2 are not limited to LEDs. For example, they may be electroluminescent (EL) lights that emit light of a plurality of colors.

<First Embodiment>

Figure 5:
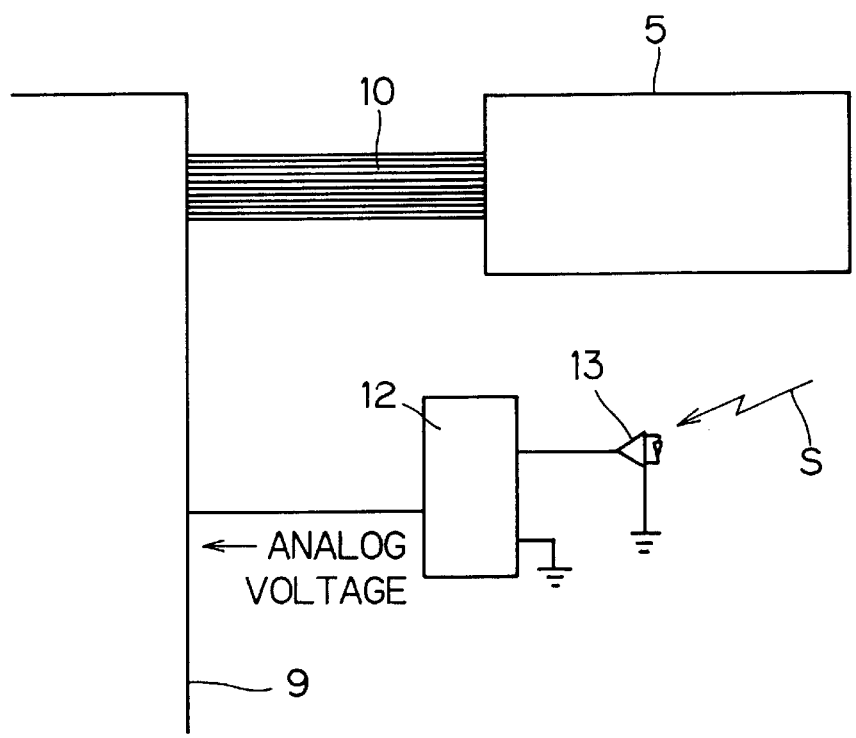
FIG. 5 shows the arrangement of a circuit for controlling a liquid crystal display in a first embodiment.

FIG. 5 shows the arrangement of a circuit for controlling the liquid crystal display 5 in this embodiment. A light receiving element 13 receives signals transmitted from the remote control unit 2, and is connected to the IC driver circuit 9 through a microcomputer 12 with digital-to-analog (D/A) conversion. While the light receiving element 13 is connected only to the IC driver circuit 9 in this embodiment, it may be connected also to another circuit such as a microcomputer for controlling the operation of the air conditioner. With this structure, the light receiving element 13 can handle all the signals transmitted from the remote control unit 2.

In this embodiment, when the display on the liquid crystal display 5 is not clearly viewed, the user adjusts the contrast of the liquid crystal panel 6 by operating the remote control unit 2. For example, the user performs a special operation such as simultaneously pushing the temperature setting button 2b and the light adjustment button 2d (see FIG. 3). A contrast adjustment signal S transmitted by this operation is received by the light receiving element 13, converted into an analog voltage by the microcomputer 12 with D/A conversion, and is then inputted to the IC driver circuit 9.

The IC driver circuit 9 has a contrast fine adjustment possible circuit. The contrast fine adjustment possible circuit controls the voltage applied to the liquid crystal panel 6 of the liquid crystal display 5 based on the analog signal from the microcomputer 12 with D/A conversion to thereby change the contrast.

When the contrast of the liquid crystal panel 6 can be adjusted with the remote control unit 2 as described above, the contrast can easily be adjusted to one where the viewability of the display is best from the user's position.

<Second Embodiment>

In this embodiment, the contrast of the liquid crystal panel 6 can be adjusted with the remote control unit 2 like in the first embodiment, and nineteen contrast settings are provided. That is, in response to the contrast adjustment signal S from the remote control unit 2, the contrast fine adjustment possible circuit of the IC driver circuit 9 changes the voltage applied to the liquid crystal panels 6 for each setting.

The contrast settings are denoted by levels (numerals) "−9" to "0" to "9". The standard contrast is the level "0". When the contrast is adjusted, the level is displayed on the liquid crystal display 5. Therefore, by confirming the displayed level, the user can adjust the contrast while grasping the degree of contrast. Consequently, the user can surely adjust the contrast.

While nineteen contrast settings are provided in this embodiment, it is needless to say that the number of settings is not limited thereto.

While the contrast settings are denoted by the numerals so that they can be displayed on the liquid crystal display 5, they may be denoted by any means. For example, the contrast settings may be graphed.

<Third Embodiment>

In this embodiment, when the contrast of the liquid crystal display panel 6 is adjusted, the backlight 7 can be turned on by operating the remote control unit 2. For example, when the remote control unit 2 is operated with the room temperature or the like being displayed on the liquid crystal display 5, the backlight 7 is lit successively in red, green and yellow.

The display on the liquid crystal display 5 is viewed differently between when the backlight 7 is on and when it is off. Therefore, by turning on the backlight 7, the condition of the contrast when the backlight 7 is on and the condition of the contrast when the backlight 7 is off can both be confirmed. Moreover, the contrast is adjustable when the backlight 7 is lit in red, green, and yellow, respectively. Therefore, the contrast can more surely be adjusted in this embodiment. It is possible to allow the backlight 7 to stay on after the adjustment is finished by operating the remote control unit 2.

The backlight 7 may be turned on not by operating the remote control unit 2 but so as to be automatically on for a predetermined period of time when the contrast is adjusted.

<Fourth Embodiment>

Figure 6:
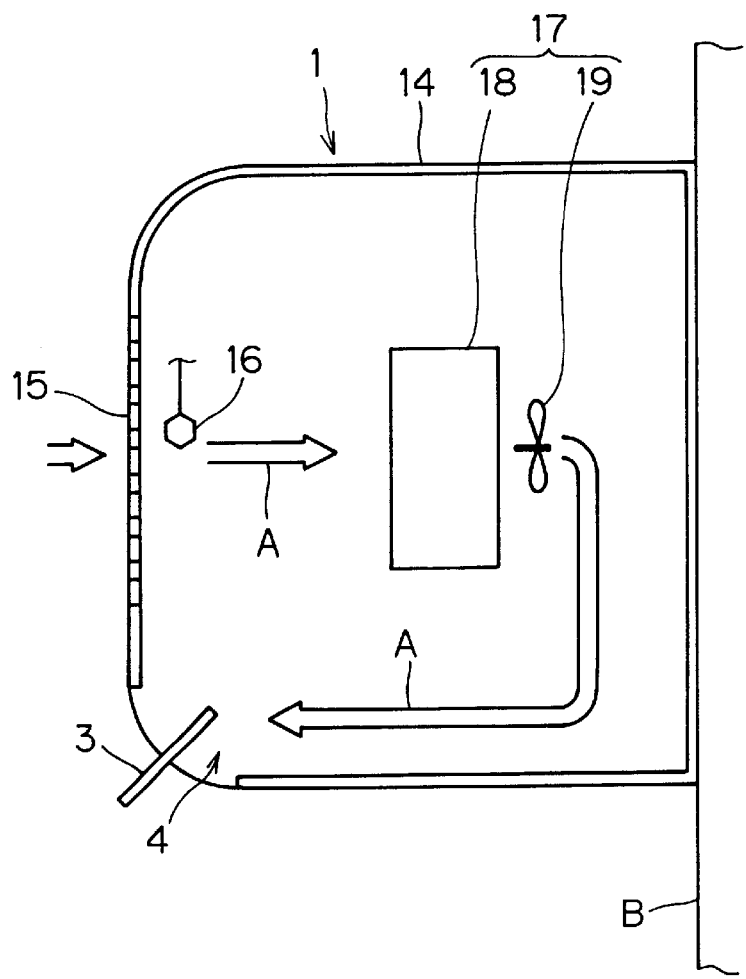
FIG. 6 is a view showing an internal structure of an indoor unit in a fourth embodiment.

FIG. 6 is a cross-sectional view briefly showing the internal structure of the indoor unit 1 in this embodiment. The indoor unit 1 has a cabinet 14 made of resin or the like. On the front surface of the cabinet 14, an air inlet 15 is formed, and the air outlet 4 incorporating the up-and-down wind direction louver 3 is formed therebelow. In the cabinet 14, air conditioning devices (not shown) such as a heat exchanger and a blowing fan are disposed. The arrow A represents the flow of the room air, and B represents the wall on which the indoor unit 1 is placed.

A gas sensor 16 for detecting the contamination of the room air is disposed in the vicinity of the air inlet 15. An air cleaner 17 for removing the contamination of the room air to clean the room air is incorporated. The air cleaner 17 comprises a combination of a cleaning filter 18 and a circulating fan 19 for blowing out the room air taken in through the cleaning filter 18 into the room through the air outlet 4. An electrostatic precipitator may be used instead of the cleaning filter 18.

While the contamination of the room air is detected with a gas sensor 16 in this embodiment, it is needless to say that any sensor that can detect the contamination of air may be used.

Figure 7:
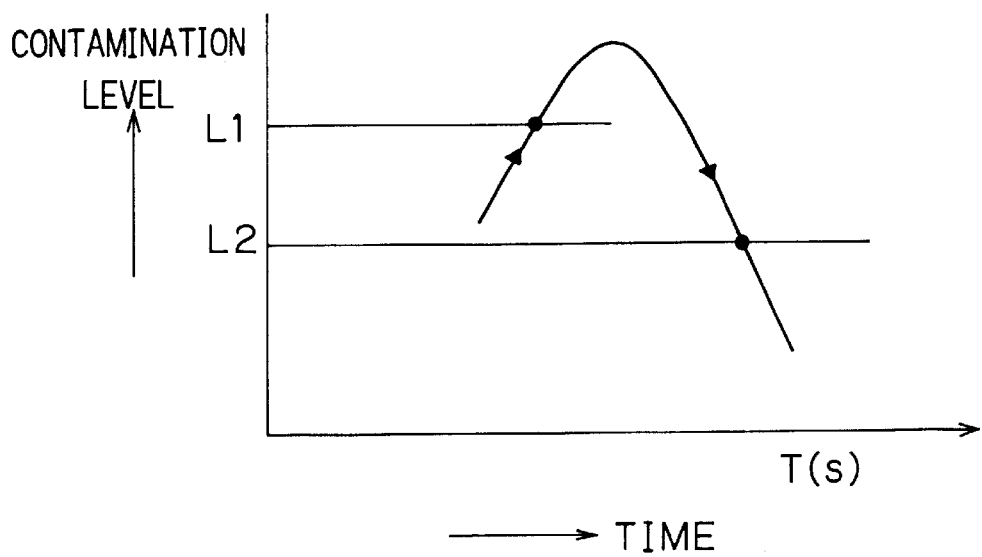
FIG. 7 is an explanatory view showing a relationship between the contamination condition of the room air and the elapsed time.
Figure 8:
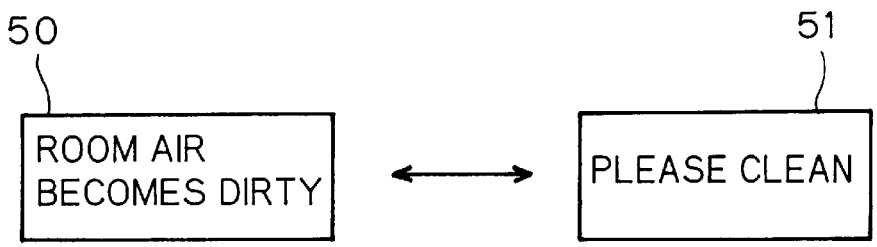
FIG. 8 is an explanatory view showing a notification display provided on a liquid crystal display in the fourth embodiment.
Figure 9:
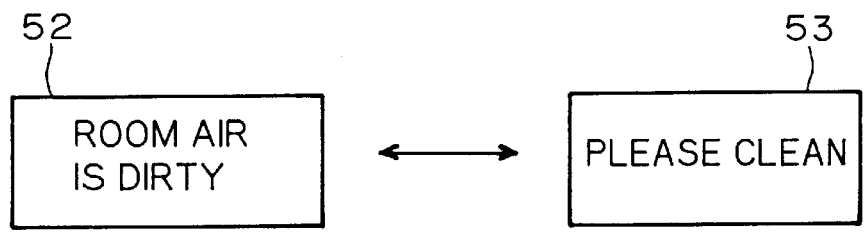
FIG. 9 is an explanatory view showing a notification display provided on the liquid crystal display in the fourth embodiment.
Figure 10:
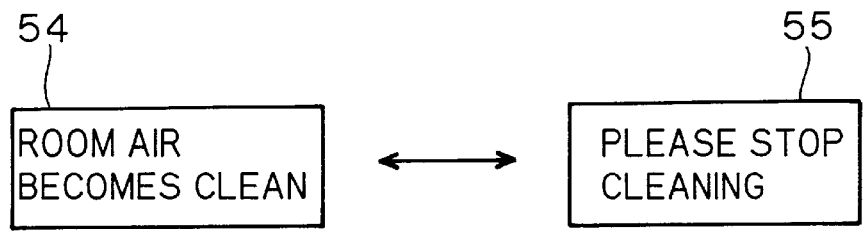
FIG. 10 is an explanatory view showing a notification display provided on the liquid crystal display in the fourth embodiment.

An operation of the air conditioner according to this embodiment will be described. FIG. 7 is an explanatory view showing a relationship between the contamination condition of the room air and the elapsed time. FIGS. 8 to 10 are explanatory views showing a notification display provided on the liquid crystal display 5.

Whether the room air is contaminated or not is monitored through the gas sensor 16 by a microcomputer for controlling the operation of the air conditioner. For example, when the contamination level detected by the gas sensor 16 exceeds a reference value L1 as shown in FIG. 7, the microcomputer determines that the room air is contaminated. Consequently, the display on the liquid crystal display 5 is changed from a normal display such as a temperature display to a notification display urging the user to perform an air cleaning operation. For example, when the air conditioner is operating, a display 50 "Room air becomes dirty" and a display 51 "Please clean" are alternately and repetitively provided as shown in FIG. 8. When the air conditioner is not operating, a display 52 "Room air is dirty" and a display 53 "Please clean" are alternately and repetitively provided as shown in FIG. 9.

When the notification display urging the user to perform the air cleaning operation is provided on the liquid crystal display 5, the liquid crystal display 5 is backlit in a color different from the color for the normal display. For example, while the liquid crystal display 5 is backlit in yellow or green for the normal display, it is backlit in red for the notification display urging the user to perform the air cleaning operation. Since the notification display is viewed against a background of a color different from the familiar color, the impact thereof on the user is greater. Therefore, the user's attention is easily called.

The user viewing the notification display on the liquid crystal display 5 that urges him or her to perform the air cleaning operation notices that the air cleaning operation is necessary. Then, the user transmits a signal to instruct the air conditioner to perform the air cleaning operation to the indoor unit 1 with the remote control unit 2. When the air conditioner is operating, the air cleaning operation by the air cleaner 17 is simultaneously performed. When the air conditioner is not operating, the air cleaning operation is singly performed. In the air cleaner 17, the contamination of the room air taken in by the circulating fan 19 is removed by the cleaning filter 18 and the air is then blown out into the room through the air outlet 4. At this time, a display "Air cleaning" (not shown) is provided on the liquid crystal display 5.

When the air cleaning operation is performed, the contamination of the room air is gradually removed. For example, when the contamination level detected by the gas sensor 16 becomes lower than a reference level L2 as shown in FIG. 7, the microcomputer determines that the room air becomes clean. Consequently, the display on the liquid crystal display 5 is changed to a notification display urging the user to stop the air cleaning operation. For example, a display 54 "Room air becomes clean" and a display 55 "Please stop cleaning" are alternately and repetitively provided as shown in FIG. 10. The user noticing this notification sends a signal to instruct the air conditioner to stop the air cleaning operation to the indoor unit 1 with the remote control unit 2. Then, the air cleaning operation by the air cleaner 17 is stopped. Thereafter, the normal display is provided on the liquid crystal display 5.

The device for cleaning the room air is not limited to the air cleaner 17 but may be a ventilator (not shown) for discharging the contaminated room air outdoors. As the ventilator, a dehumidifier/humidifier or a humidifier disclosed in Japanese Laid-open Patent Applications Nos. H8-270980 and H10-47706 having already been proposed by the applicant of the present invention is usable.

In a case where the indoor unit 1 incorporates a ventilator, when contamination of the room air is detected, a notification display "Please ventilate" (not shown) urging the user to perform the ventilating operation is provided on the liquid crystal display 5, and the liquid crystal display 5 is backlit in a color different from the color for the normal display. When the user instructs the air conditioner to perform the ventilating operation, in a case where the air conditioner is operating, the ventilating operation by the ventilator is simultaneously performed. In a case where the air conditioner is not operating, the ventilating operation is singly performed. The ventilator discharges contaminated air outdoors.

During the ventilating operation, a display "Ventilating" (not shown) is provided on the liquid crystal display 5. When the contamination of the room air is removed, the display on the liquid crystal display 5 is changed to a notification display urging the user to stop the ventilating operation. When the ventilating operation is stopped, the display is returned to the normal display.

The microcomputer may have an operation controlling function. In this case, after the notification display urging the user to perform the air cleaning operation or the ventilating operation is provided on the liquid crystal display 5, the operation of the air cleaner or the ventilator is started without waiting for the user's instruction to perform the air cleaning operation or the ventilating operation. With this structure, since the air cleaning operation or the ventilating operation is automatically performed without troubling the user to provide an instruction when it is necessary to clean the air, the convenience of the air conditioner significantly increases.

As described above, in the air conditioner of this embodiment, the notification display urging the user to perform the air cleaning operation or the ventilating operation is provided on the liquid crystal display 5 in accordance with the contamination of the room air. Therefore, by viewing the liquid crystal display 5, the user can precisely find the contamination of the room air that varies with time. As a result, the user can appropriately instruct the air conditioner to perform the air cleaning operation or the ventilating operation.

<Fifth Embodiment>

Figure 11:
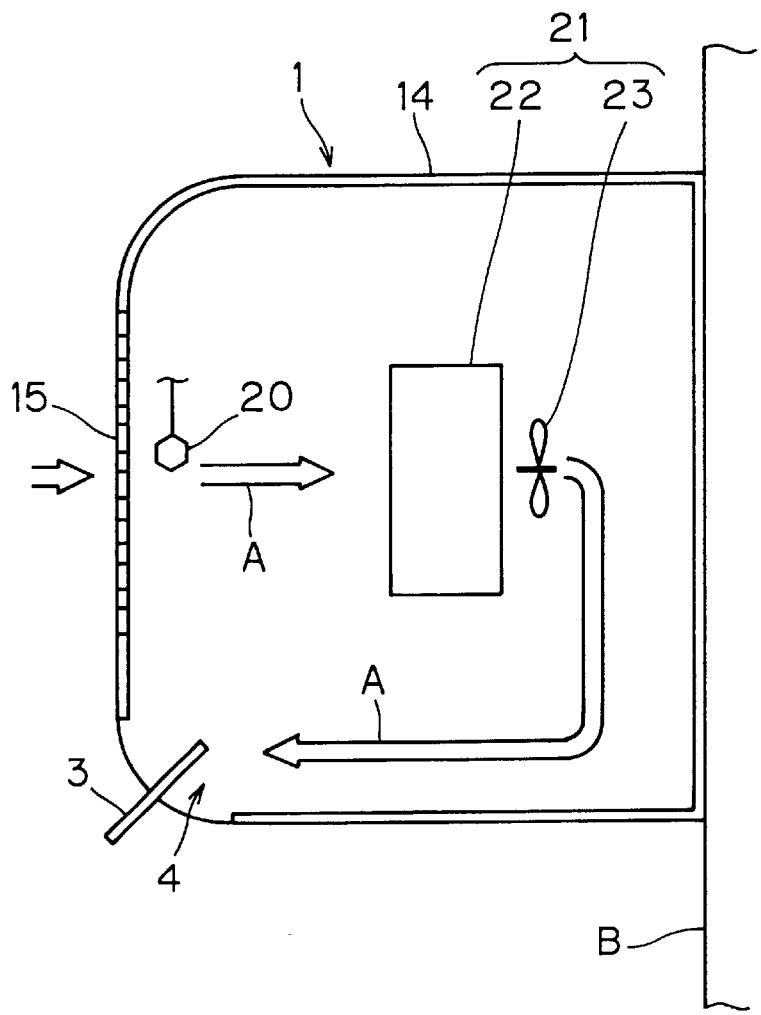
FIG. 11 shows an internal structure of an indoor unit in a fifth embodiment.

FIG. 11 is a cross-sectional view briefly showing the internal structure of the indoor unit 1 in this embodiment. In the cabinet 14 of the indoor unit 1, a humidity sensor 20 for detecting the humidity of the room air is disposed in the vicinity of the air inlet 15. A dehumidifier 21 for removing moisture from the room air is also incorporated. The dehumidifier 21 comprises a combination of a dehumidifying filter 22 where a hygroscopic material that absorbs moisture such as zeolite is applied, and a circulating fan 23 for blowing out the room air taken in through the dehumidifying filter 22 into the room through the air outlet 4.

Figure 12:
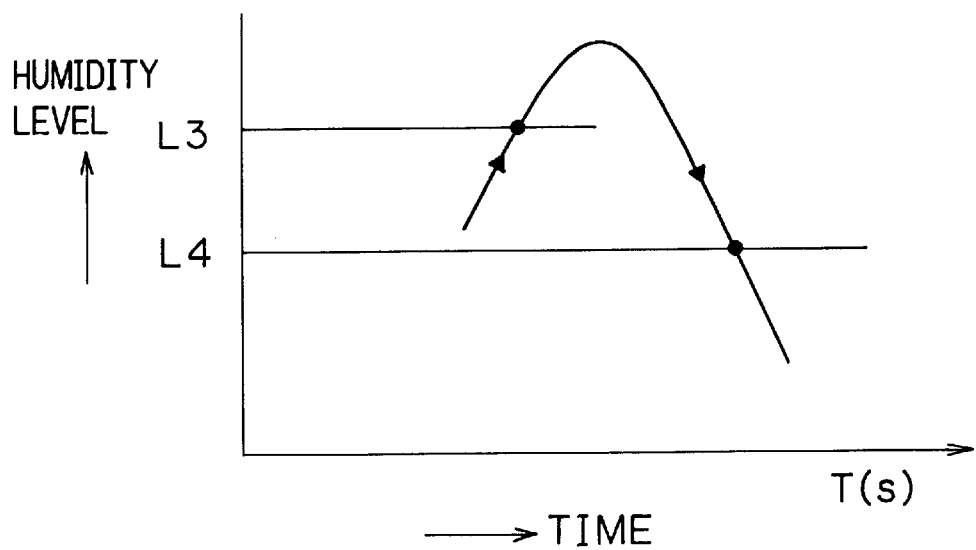
FIG. 12 is an explanatory view showing a relationship between the humidity of the room air and the elapsed time.
Figure 13:
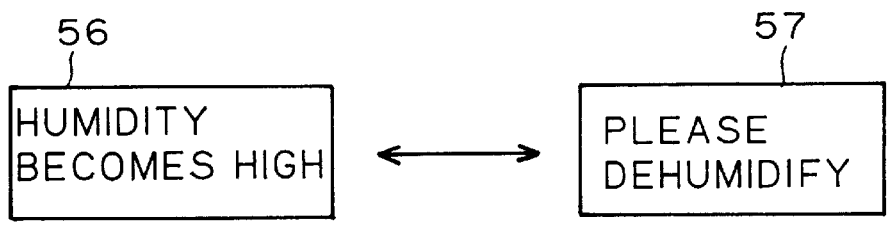
FIG. 13 is an explanatory view showing a notification display provided on a liquid crystal display in the fifth embodiment.
Figure 14:
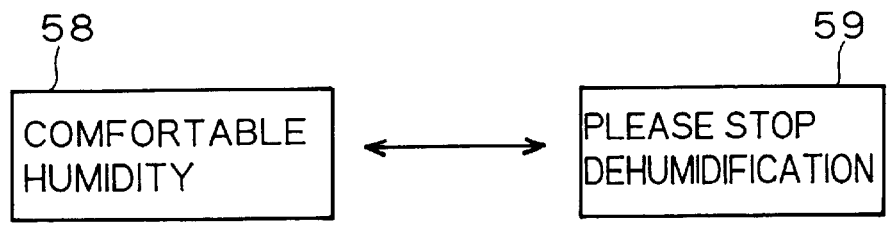
FIG. 14 is an explanatory view showing a notification display provided on a liquid crystal display in the fifth embodiment.

An operation of the air conditioner according to this embodiment will be described. FIG. 12 is an explanatory view showing a relationship between the humidity of the room air and the elapsed time. FIGS. 13 and 14 are explanatory views showing notification displays provided on the liquid crystal display 5.

The humidity of the room air is monitored by the microcomputer through the humidity sensor 20. For example, when the humidity level detected by the humidity sensor 20 exceeds a reference level L3 as shown in FIG. 12, the microcomputer determines that the room air has a high humidity. Consequently, the display on the liquid crystal display 5 is changed from the normal display to a notification display urging the user to perform the dehumidifying operation. For example, when the air conditioner is operating, a display 56 "Humidity becomes high" and a display 57 "Please dehumidify" are alternately and repetitively provided as shown in FIG. 13. When the air conditioner is not operating, a display "Humidity is high" and a display "Please dehumidify" (not shown) are alternately and repetitively provided.

When the notification display urging the user to perform the dehumidifying operation is provided on the liquid crystal display 5, the liquid crystal display 5 is backlit in a color different from the color for the normal display like in the fourth embodiment. For example, while the liquid crystal display 5 is backlit in yellow or green for the normal display, it is backlit in red for the notification display urging the user to perform the dehumidifying operation. Since the notification display is viewed against a background of a color different from the familiar color, the impact thereof on the user is greater. Therefore, the user's attention is easily called.

The user viewing the notification display on the liquid crystal display 5 that urges him or her to perform the dehumidifying operation notices that the dehumidifying operation is necessary. Then, the user transmits a signal to instruct the air conditioner to perform the dehumidifying operation to the indoor unit 1 with the remote control unit 2. When the air conditioner is operating, the dehumidifying operation by the dehumidifier 21 is simultaneously performed. When the air conditioner is not operating, the dehumidifying operation is singly performed. In the dehumidifier 21, the moisture of the room air taken in by the circulating fan 23 is removed by being absorbed by the dehumidifying filter 22 and the air is then blown out into the room through the air outlet 4. At this time, a display "Dehumidifying" (not shown) is provided on the liquid crystal display 5.

When the dehumidifying operation is performed, the humidity of the room air gradually decreases. For example, when the humidity level detected by the humidity sensor 20 becomes lower than a reference level L4 as shown in FIG. 12, the microcomputer determines that the room air no longer has a high humidity. Consequently, the display on the liquid crystal display 5 is changed to a notification display urging the user to stop the dehumidifying operation. For example, a display 58 "Comfortable humidity" and a display 59 "Please stop dehumidification" are alternately and repetitively provided as shown in FIG. 14. The user noticing this notification sends a signal to instruct the air conditioner to stop the dehumidifying operation to the indoor unit 1 with the remote control unit 2. Then, the dehumidifying operation by the dehumidifier 21 is stopped. Thereafter, the normal display is provided on the liquid crystal display 5.

Figure 15:
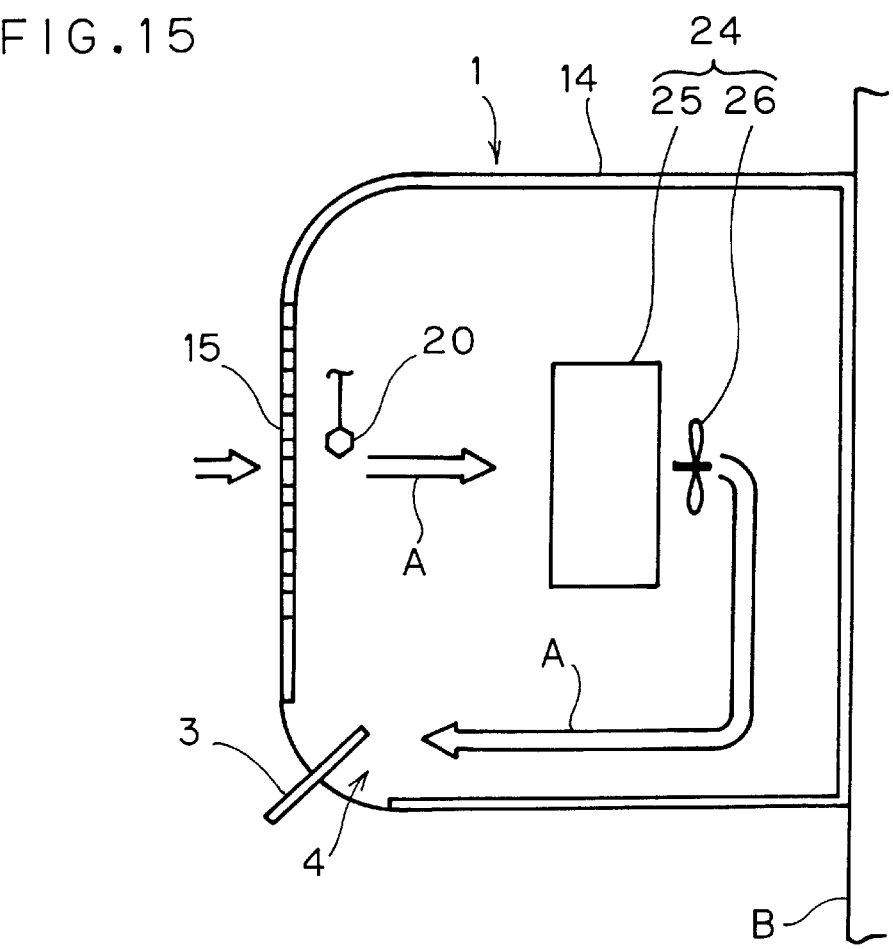
FIG. 15 shows another structure of the indoor unit in the fifth embodiment.

While the above-described indoor unit 1 has the dehumidifier 21, a humidifier may be provided instead. FIG. 15 is a cross-sectional view briefly showing the internal structure of the indoor unit 1 having a humidifier. The humidifier 24 comprises a combination of a humidifying filter 25 having absorbed moisture and a circulating fan 26 for blowing out the room air taken in through the humidifying filter 25 into the room through the air outlet 4.

Figure 16:
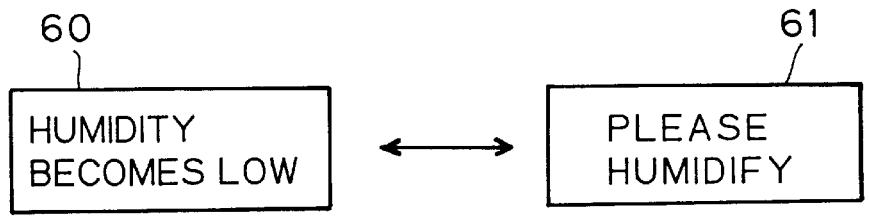
FIG. 16 is an explanatory view showing another notification display provided on the liquid crystal display in the fifth embodiment.

In this case, the microcomputer determines that the room air is dry based on a decrease in humidity level detected by the humidity sensor 20. Consequently, the display on the liquid crystal display 5 is changed from the normal display to a notification display urging the user to perform a humidifying operation. For example, when the air conditioner is operating, a display 60 "Humidity becomes low" and a display 61 "Please humidify" are alternately and repetitively provided as shown in FIG. 16. When the air conditioner is not operating, a display "Humidity is low" and a display "Please humidify" (not shown) are alternately and repetitively provided. The liquid crystal display 5 is backlit in a color different from the color for the normal display.

The user viewing the notification display on the liquid crystal display 5 that urges him or her to perform the humidifying operation transmits a signal to instruct the air conditioner to perform the humidifying operation to the indoor unit 1 with the remote control unit 2. When the air conditioner is operating, the humidifying operation by the humidifier 24 is simultaneously performed. When the air conditioner is not operating, the air cleaning operation is singly performed. In the humidifier 24, by the humidifying filter 25, the moisture is added to the room air taken in by the circulating fan 26 and the air is then blown out into the room through the air outlet 4. At this time, a display "Humidifying" (not shown) is provided on the liquid crystal display 5.

Figure 17:
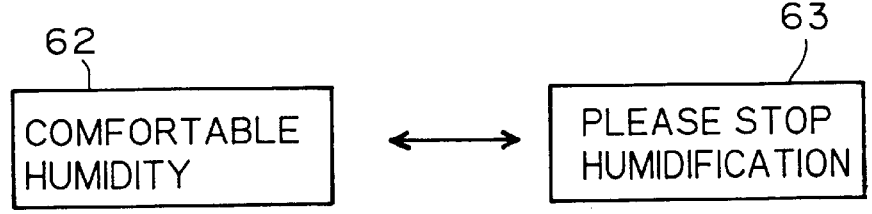
FIG. 17 is an explanatory view showing another notification display provided on the liquid crystal display in the fifth embodiment.

When the humidity of the room air becomes appropriate, the display on the liquid crystal display 5 is changed to a notification display urging the user to stop the humidifying operation. For example, a display 62 "Comfortable humidity" and a display 63 "Please stop humidification" are alternately and repetitively provided as shown in FIG. 17. Consequently, the user stops the humidifying operation by operating the remote control unit 2. Thereafter, the normal display is provided on the liquid crystal display 5.

Instead of the above-described dehumidifier 21 and humidifier 24, a dehumidifier/humidifier or a humidifier disclosed in Japanese Laid-open Patent Applications Nos. H8-270980 and H10-47706 having already been proposed by the applicant of the present invention may be used. For example, in a dehumidifier/humidifier (not shown) disclosed in Japanese Laid-open Patent Application No. H8-270980, a hygroscopic material absorbing moisture in the air has a ventilating opening, and this material rotates between two parts into which a ventilating path is partitioned. While moisture in the air flowing in one part of the ventilating path is absorbed by the hygroscopic material to dehumidify the air, the moisture absorbed by the hygroscopic material is supplied to the air flowing in the other part of the ventilating path to humidify the air. In this device, the hygroscopic material is heated and the evaporated moisture is supplied to the air in the other part of the ventilating path to thereby humidify the air. By using such a dehumidifier/humidifier in the air conditioner of this embodiment, an air conditioner can be realized having both dehumidifying and humidifying functions.

The microcomputer may have an operation controlling function. In this case, after the notification display urging the user to perform the dehumidifying operation or the humidifying operation is provided on the liquid crystal display 5, the operation of the dehumidifier or the humidifier is continuously started without waiting for the user's instruction to perform the dehumidifying operation or the humidifying operation. With this structure, since the dehumidifying operation or the humidifying operation is automatically performed without troubling the user to provide an instruction when it is necessary to dehumidify or humidify the air, the convenience of the air conditioner significantly increases.

As described above, in the air conditioner of this embodiment, the notification display urging the user to perform the dehumidifying operation or the humidifying operation is provided on the liquid crystal display 5 in accordance with the humidity of the room air. Therefore, by viewing the liquid crystal display 5, the user can precisely find the humidity of the room air that varies with time. As a result, the user can appropriately instruct the air conditioner to perform the dehumidifying operation or the humidifying operation.

<Sixth Embodiment>

In the air conditioner of this embodiment, the microcomputer controls the operation in response to a signal transmitted from the remote control unit 2. The microcomputer has abnormality detecting means for detecting that a failure or an abnormality occurs in the air conditioner, and operation condition detecting means for detecting that the air conditioner is in a condition of not being able to perform the operation it is instructed to perform.

Figure 18:
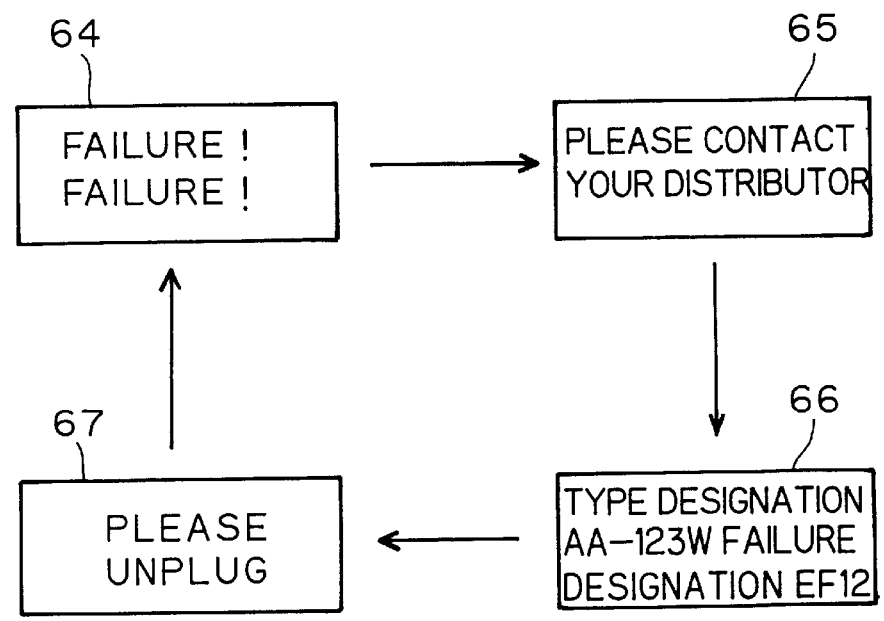
FIG. 18 is an explanatory view showing a notification display provided on a liquid crystal display in a sixth embodiment.

An operation of the air conditioner according to this embodiment will be described. FIG. 18 is an explanatory view showing a notification display provided on the liquid crystal display 5 of the air conditioner. When the microcomputer has the abnormality detecting means, a failure occurring in the air conditioner that is operating is detected by the abnormality detecting means. Consequently, the display on the liquid crystal display 5 is changed from the normal display to a notification display informing the user of the occurrence of the failure in the air conditioner. For example, a display 64 "Failure !", a display 65 "Please contact your distributor", a display 66 "Model designation AA-123W Failure designation EF12", and a display 67 "Please unplug" are alternately and repetitively provided as shown in FIG. 18. Therefore, it is necessary for the user only to follow the notification display, so that unnecessary worry and confusion are never caused to the user.

When the operation of the air conditioner is hindered by a lightning strike or the like, the abnormality detecting means detects this abnormality. Consequently, the display on the liquid crystal display 5 is changed from the normal display to a notification display indicating that an abnormality occurs in the air conditioner. For example, a display "Please re-plug" (not shown) is provided, so that the user re-plugs the air conditioner following the notification display.

When lightning occurs, there is a possibility that noise resulting therefrom causes malfunctioning of the microcomputer of the controlling circuit, hindering its normal functioning. In this case, the user needs to unplug the air conditioner from the power outlet to turn it off first, and then plug it again to the power outlet after a while. By doing so, when the air conditioner is turned on next time, the microcomputer is reset, and thereby the initial settings are recovered. Thus, recovery from the malfunctioning state is achieved.

In a case where the microcomputer has the operation condition detecting means, for example, when the user instructs the air conditioner to perform the heating operation with the remote control unit 2 while the defrosting operation is being performed, the operation condition detecting means detects that the operation the air conditioner is instructed to perform cannot be performed. Consequently, the display on the liquid crystal display 5 is changed from the normal display to a notification display indicating that the operation the air conditioner is instructed to perform cannot be performed (not shown). Therefore, the user can handle this composedly.

In this embodiment, like in the first to the fifth embodiments, the liquid crystal display 5 is backlit in a color different from the color for the normal display when the notification display indicating that a failure occurs in the air conditioner, the notification display indicating that an abnormality occurs and the notification display indicating that the operation the air conditioner is instructed to perform cannot be performed are provided on the liquid crystal display 5. Since the notification display is viewed against a background of a color different from the familiar color, the impact thereof on the user is greater. Therefore, the user's attention is easily called.

As described above, in the air conditioner of this embodiment, even when a failure occurs or when the operation the air conditioner is instructed to perform cannot be performed, a notification display indicating this is provided on the liquid crystal display 5. Consequently, by viewing the liquid crystal display 5, the user can precisely find the condition of the air conditioner. As a result, the user can easily handle the situation without being unnecessarily worried or confused.

<Seventh Embodiment>

In this embodiment, like in the fourth to the sixth embodiments, notification displays are provided on the liquid crystal display 5 in accordance with the condition of the room air and the operation condition of the air conditioner, and the display time of the notification displays is preset. That is, since the time necessary for the user to notice the notification display on the liquid crystal display 5 is considered to be approximately 5 to 30 seconds, a time of approximately this length is preset as the display time. After the display time has elapsed, the display is returned from the notification display to the normal display.

When the user operates the remote control unit 2 after the notification display on the liquid crystal display 5 is erased upon the elapse of the display time, the notification display is again provided. Therefore, even when the user overlooks the notification display, he or she can surely notice the notification.

There are cases where, when the user requests re-provision of a notification display, the condition of the notification display has already been resolved. Assume that when the user requests re-provision of the erased notification display after the notification display urging the user to perform the air cleaning operation is erased, the contamination of the room air has already been removed. In this case, since it is unnecessary to make the user recognize that the notification display was provided, the notification display is not re-provided on the liquid crystal display 5 even though it is requested by the user.

To provide the notification displays, the backlight 7 is continuously on or blinked. When the backlight 7 is blinked, it is desirable that the blinking period be one second per one time.

The notification displays provided on the liquid crystal display 5 may be accompanied by a sound or a voice. For example, the provision of a notification display is informed of with a beep or a voice. With this, the user's attention is called, so that the user can request an appropriate instruction from the air conditioner. Consequently, the possibility is reduced that the user does not notice the notification display.

<Eighth Embodiment>

In the air conditioner of this embodiment, the operation start time can be set with a timer. For approximately 2 to 60 minutes prior to the operation start time, a warm-up operation is performed. At this time, the backlight 7 of the liquid crystal display 5 is not turned on. The warm-up operation is an operation performed based on the difference between the room temperature and the set temperature. Strictly speaking, the operation start time mentioned above refers not to the time when the air conditioner starts to operate but to the "reservation time for air conditioning", i.e. the time by which the room air has already been brought into the condition as intended. For example, if the timer is set for the room temperature of 20° C. and the operation start time of 7 a.m., the air conditioner checks the room temperature as well as the outdoor air temperature at 6 a.m. Then, the air conditioner starts to perform a heating operation at 6 a.m. on a cold morning, or at 6:58 a.m. at latest on a warm morning, so as to raise the room temperature to 20° by 7 a.m. In this case, the operation performed by the air conditioner during the period from the time when it actually starts to operate up to the operation start time for which the timer is set (i.e. 7 a.m.) is a warm-up operation.

Figure 19:
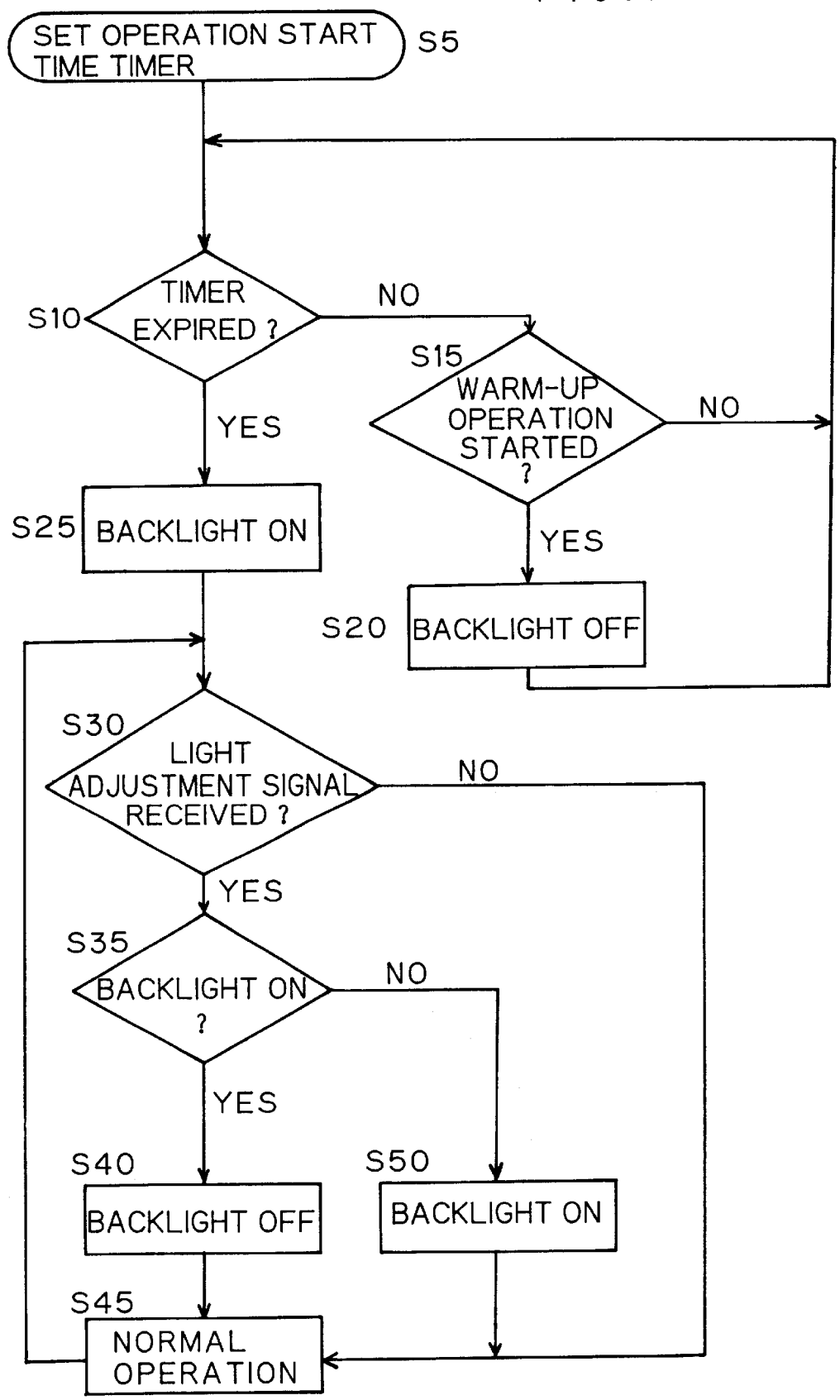
FIG. 19 is a flowchart showing an operation of an air conditioner according to an eighth embodiment.

FIG. 19 is a flowchart showing an operation performed by the microcomputer. When the operation start timer button 2c (see FIG. 3) of the remote control unit 2 is operated to set the operation start time with the timer, the flowchart is started (step S5).

Figure 3:
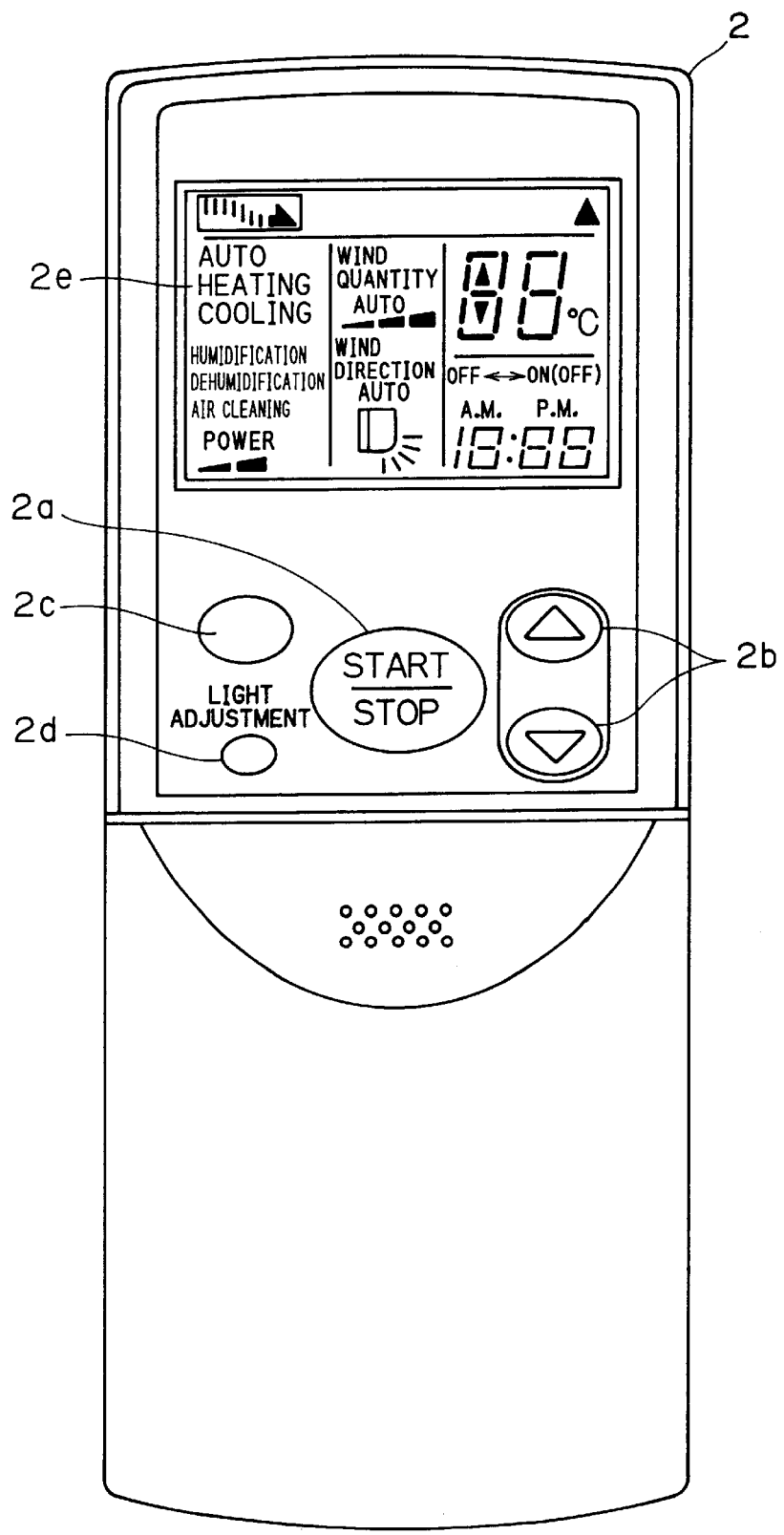
FIG. 3 is a front view of the remote control unit.
Figure 4:
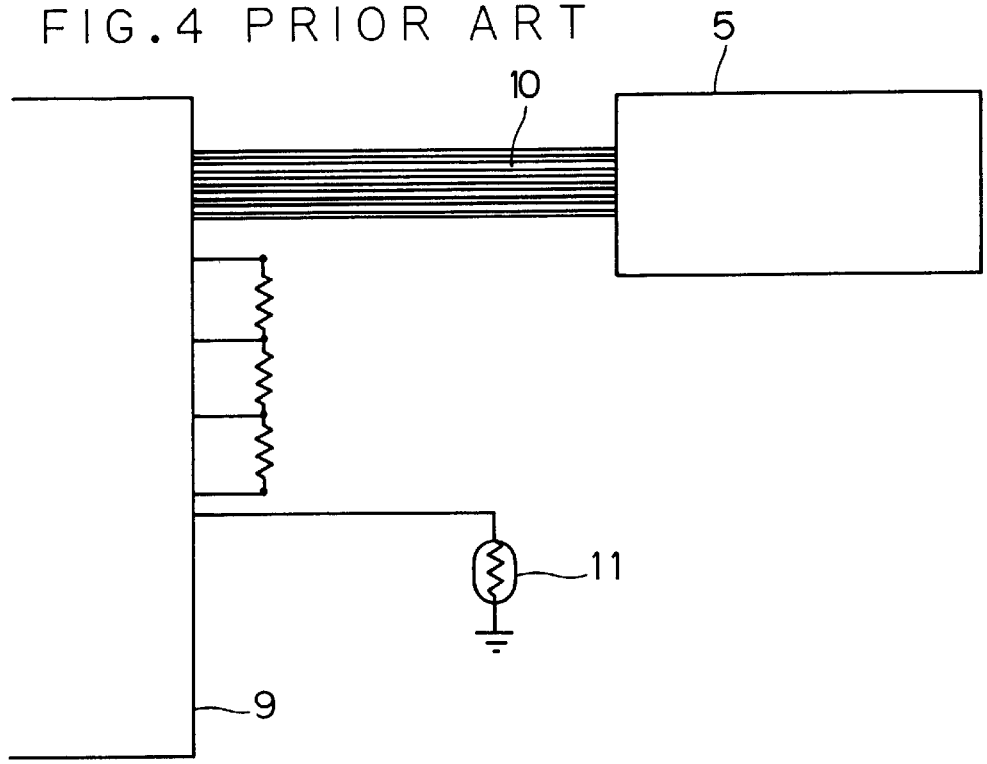
FIG. 4 shows the arrangement of the conventional circuit for controlling the liquid crystal display.

Here, an example of a timer setting operation will be described with reference to FIG. 3. First, by pulling the cover for covering the lower part of the remote control unit 2 downward, a plurality of operation buttons (not shown) provided underneath the cover are exposed. These operation buttons include a forward button, a backward button, a reserve button, a cancel button, and an operation switching button. For example, in order to set the timer for the operation start time (i.e. the time by which the room temperature should be raised as desired) of 7 a.m., first, the operation start timer button 2c is operated to blink the "ON" indicator displayed on the liquid crystal display 2e. Switching between the indicators "ON" and "OFF" is achieved by pressing the operation start timer button 2c. Then, the forward and backward buttons are operated to set the operation start time. The operation start time can be adjusted in ten-minute increments or decrements by pressing the forward or backward button, respectively. Keeping one of these buttons pressed allows faster adjustment. Thereafter, the operation switching button is operated to set the room temperature, the wind quantity, and the wind direction as desired. Lastly, by pressing the reserve button while the "ON" indicator is blinking, the timer setting operation is completed. Cancellation of the settings made is achieved by pressing the cancel button. It is needless to say that the timer operation is not limited to the above-described procedure.

In FIG. 19, whether the timer has expired or not is determined at step S10. When it is determined that the timer has not expired, whether the warm-up operation has been started or not is determined at step S15. When the warm-up operation has been started, the backlight 7 of the liquid crystal display 5 is maintained off at step S20. When it is determined that the timer has expired, the backlight 7 is turned on at step S25.

Then, whether the light adjustment button 2d (see FIG. 3) of the remote control unit 2 is pressed or not is determined at step S30. When a light adjustment signal is received, in a case where backlight 7 is on at step S35, after the backlight 7 is turned off at step S40, the normal operation is continued (step S45). In a case where the backlight 7 is off, after the backlight 7 is turned on at step S50, the normal operation is continued (step S45). As long as the light adjustment signal is not received, the normal operation is continued. During the normal operation, whether the light adjustment signal is received or not is always monitored at step S30.

In the air conditioner of this embodiment, since the backlight 7 is off during lhe warm-up operation, the power consumption is small compared to that of the conventional air conditioner in which the backlight 7 is on. In addition, when the operation start time is set with the timer in accordance with the time when the user gets up, it never occurs that the user is awaken by the backlight 7 being turned on before the user wakes up.

Obviously, many modifications and variations of the present invention are possible in light of the above teachings. It is therefore to be understood that within the scope of the appended claims, the invention may be practiced other than as specifically described.

What is claimed is:

1. An air conditioner comprising:
   an indoor unit;
   a liquid crystal display provided on said indoor unit for displaying various pieces of information; and
   a remote control unit for transmitting a signal to instruct said air conditioner to operate,
   wherein a contrast of a display on said liquid crystal display is adjustable by operating said remote control unit.

2. An air conditioner according to claim 1, wherein said contrast of the display is adjustable among a plurality of levels, and when the contrast is adjusted, said levels of contrast denoted by letters or figures are displayed on said liquid crystal display.

3. An air conditioner according to claim 1, further comprising a backlight provided on said liquid crystal display for illuminating the display on the liquid crystal display,
   wherein said backlight is turned on when the contrast is adjusted.

4. An air conditioner according to claim 1, wherein the contrast of the display on the liquid crystal display is adjustable solely by operating the remote control unit.

5. An air conditioner comprising:
   an indoor unit;
   a liquid crystal display provided on said indoor unit for displaying various pieces of information;
   a backlight provided on said liquid crystal display for illuminating a display on the liquid crystal display;
   at least one of an air cleaner, a ventilator, a dehumidifier and a humidifier; and
   at least one of contamination detecting means for detecting contamination of room air and humidity detecting means for detecting humidity of room air,
   wherein when said contamination detecting means detects contamination of the room air, a notification display urging said air cleaner or said ventilator to operate is provided on said liquid crystal display, or when said humidity detecting means detects that humidity of the room air is high, a notification display urging said dehumidifier to operate is provided, or when said humidity detecting means detects that the room air is dry, a notification display urging said humidifier to operate is provided, and said backlight is lit in a color different from a color for a normal display.

6. An air conditioner according to claim 5, wherein said notification display is erased after shown on said liquid crystal display for a preset display time, and is again shown when an instruction to show the display again is provided.

7. An air conditioner according to claim 6, wherein when condition of the room air indicated by said notification display has already been resolved, the notification display is not shown even if the instruction to show the display again is provided.

8. An air conditioner comprising:
   an indoor unit;
   a liquid crystal display provided on said indoor unit for displaying various pieces of information; and
   a backlight provided on said liquid crystal display for illuminating a display on the liquid crystal display; and
   at least one of abnormality detecting means for detecting a failure and an abnormality of said air conditioner and operation condition detecting means for detecting that an operation said air conditioner is instructed to perform cannot be performed,
   wherein when said abnormality detecting means detects a failure of said air conditioner, a notification display indicating that a failure occurs is provided or when said operation condition detecting means detects that an operation said air conditioner is instructed to perform cannot be performed, a notification display indicating that the operation cannot be performed is provided, and the backlight is lit in a color different from a color for normal display.

9. An air conditioner according to claim 8, wherein said notification display is erased after shown on said liquid crystal display for a preset display time, and is again shown when an instruction to show the display again is provided.

10. An air conditioner according to claim 9, wherein condition of said air conditioner indicated by said notification display has already been resolved, the notification display is not shown even if the instruction to show the display again is provided.

11. An air conditioner comprising:
    an indoor unit;
    a liquid crystal display provided on said indoor unit for displaying various pieces of information; and
    a backlight provided on said liquid crystal display for illuminating a display on the liquid crystal display;
    a remote control unit for transmitting a signal to instruct said air conditioner to operate and a signal to turn on or off said backlight; and
    a timer for controlling operation of said air conditioner in such a way that previously set conditions will be satisfied at a previously set operation reservation time,
    wherein, when a specific operation reservation time is set in said timer, said backlight is kept off during a warm-up operation, which said air conditioner performs prior to said specific operation reservation time so that the previously set conditions will be satisfied at said specific operation reservation time, and said backlight is turned on when said specific operation reservation time has come.

* * * * *